United States Patent
Matsumoto et al.

(10) Patent No.: US 6,947,194 B2
(45) Date of Patent: Sep. 20, 2005

(54) METHOD FOR COMPENSATING POLARIZATION MODE DISPERSION, POLARIZATION MODE DISPERSION COMPENSATOR AND OPTICAL FIBER COMMUNICATION SYSTEM

(75) Inventors: Masayuki Matsumoto, Suita (JP); Daniele Alzetta, Suita (JP)

(73) Assignee: Osaka University, Osaka (JP)

( * ) Notice: Subject to any disclaimer, the term of this patent is extended or adjusted under 35 U.S.C. 154(b) by 0 days.

(21) Appl. No.: 10/754,705

(22) Filed: Jan. 12, 2004

(65) Prior Publication Data

US 2004/0207900 A1 Oct. 21, 2004

(30) Foreign Application Priority Data

Jan. 15, 2003 (JP) .......................................... 2003-006887

(51) Int. Cl.[7] .............................. G02F 1/09; H04B 10/00
(52) U.S. Cl. .......................... 359/280; 359/281; 398/152
(58) Field of Search ................................. 359/280–283, 359/738; 398/147, 152, 158, 9–38

(56) References Cited

U.S. PATENT DOCUMENTS 6,681,081 B2 * 1/2004 Mao ............................ 398/147
6,728,491 B1 * 4/2004 Ooi et al. .................... 398/147

* cited by examiner

Primary Examiner—Georgia Epps
Assistant Examiner—M. Hasan
(74) Attorney, Agent, or Firm—Oliff & Berridge, PLC

(57) ABSTRACT

An optical signal is introduced into a polarization rotator to control the optical signal so that the output of the optical signal is maximized through the rotation of a plane of polarization of the optical signal, and then, introduced into the polarizer to pass a linear polarization of the optical signal therethrough, and then, introduced into the optical electric power detector to detect the output of the optical signal.

17 Claims, 2 Drawing Sheets

METHOD FOR COMPENSATING POLARIZATION MODE DISPERSION, POLARIZATION MODE DISPERSION COMPENSATOR AND OPTICAL FIBER COMMUNICATION SYSTEM

BACKGROUND OF THE INVENTION

1. Field of the Invention

This invention relates to a method for compensating polarization mode dispersion, a polarization mode dispersion compensator and an optical fiber communication system, which are preferably employed in high speed optical fiber communication system and the like.

2. Description of the Prior Art

In high speed optical communication fiber system of 10 G bits/sec and over, the polarization mode dispersion becomes conspicuous as the communication path is elongated, so that the wave distortion of an optical signal under communication also becomes large to degrade the optical signal and thus, increase the bit error rate. As a result, the optical communication can not be realized under good condition. In this point of view, in order to realize the optical communication over long communication path under good condition, it is required to compensate the polarization mode dispersion by some kind or another means. In contrast, the polarization mode dispersion is changed with time when some optical fibers are employed in order to realize the optical fiber communication, so that it is required to compensate the polarization mode dispersion with time under the optical communication.

Conventionally, the compensation for the polarization mode dispersion has been carried out as described in Koichi Takiguchi, "Polarization mode dispersion (PMD) compensation device", Optoelectronics, December, 2002, pp66–70. According to the conventional document, a polarization mode dispersion compensator with a polarization controller therein is employed and installed in front of a receiver or in the communication line. Then, the degree of polarization or a specific frequency component of an output signal from the compensator is selected as a monitoring signal, and the polarization controller is controlled under feedback so that the output of the monitoring signal becomes maximum.

In the feedback control, however, a complicated circuit is required to extract and select the monitoring signal, resulting in the complication of the total structure of the compensator. Moreover, since it is required that two or over parameters are controlled, the algorithm becomes complicated, so that the speed of response is lowered.

SUMMERY OF THE INVENTION

It is an object of the present invention to inhibit the polarization mode dispersion utilizing a simple compensator and to realize optical communication over long communication path.

In order to achieve the above-mentioned objects, this invention relates to a method for compensating polarization mode dispersion, comprising the steps of:

extracting and selecting an optical signal as a monitoring signal, detecting an output of the optical signal, and controlling the optical signal so that the output of the optical signal is maximized.

In the polarization mode dispersion compensating method according to the present invention, the optical signal to be transferred is directly extracted as a monitoring signal, and the output of the monitoring signal is rendered maximum to inhibit the polarization mode dispersion under optical communication sufficiently and simply. Therefore, the wave distortion of the optical signal due to the polarization mode dispersion can be inhibited sufficiently to decrease the bit error rate and realize the optical communication under good condition.

In this way, in the present invention, only if the output of the optical signal extracted and selected as the monitoring signal is controlled, the polarization mode dispersion can be compensated. In this case, the output of the optical signal is considered as a parameter, so that the algorithm can be simplified and the speed of response can be enhanced.

For example, the polarization mode compensation is carried out utilizing a polarization mode dispersion compensator. The polarization mode dispersion compensator may include a polarization rotator, a polarizer and an optical electric power detector. In this case, the optical signal is introduced into the polarization rotator and the plane of polarization of the optical signal is rotated so that the output of the optical signal can be maximized. Then, the optical signal is introduced into the polarizer from the polarization rotator to pass the linear polarization of the optical signal through the polarizer. The linear polarization is detected at the optical electric power detector.

If a plurality of polarization mode dispersion compensators are employed, the above-mentioned polarization mode dispersion compensating process can be performed in multistage. In this case, the compensation for the polarization mode dispersion can be performed more effectively and efficiently. Therefore, the optical communication can be realized under good condition because the optical signal can not be almost degraded due to the effective and efficient polarization mode dispersion compensation.

Moreover, in the polarization mode dispersion compensating method of the present invention, it is desired that the output of the optical signal is amplified by means of an amplifier after the polarization mode dispersion compensator. In this case, the signal loss caused by the polarizer in the compensator can be compensated in a distributed manner, and the total noise generated by the amplifiers can be decreased, so that large signal/noise ratio (S/N ratio) of the optical signal can be maintained even when the polarization mode dispersion compensators are used.

According to the polarization mode dispersion compensating method of the present invention, an optical fiber communication system, which can be utilized over long communication path, can be provided. The optical fiber communication system includes a transmitter, a receiver and a polarization mode dispersion compensator as mentioned above.

The polarization mode dispersion compensator is provided between the transmitter and the receiver and connected therewith to complete an entire optical path to transfer the optical signal.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to the accompanying drawings.

Figure 1:
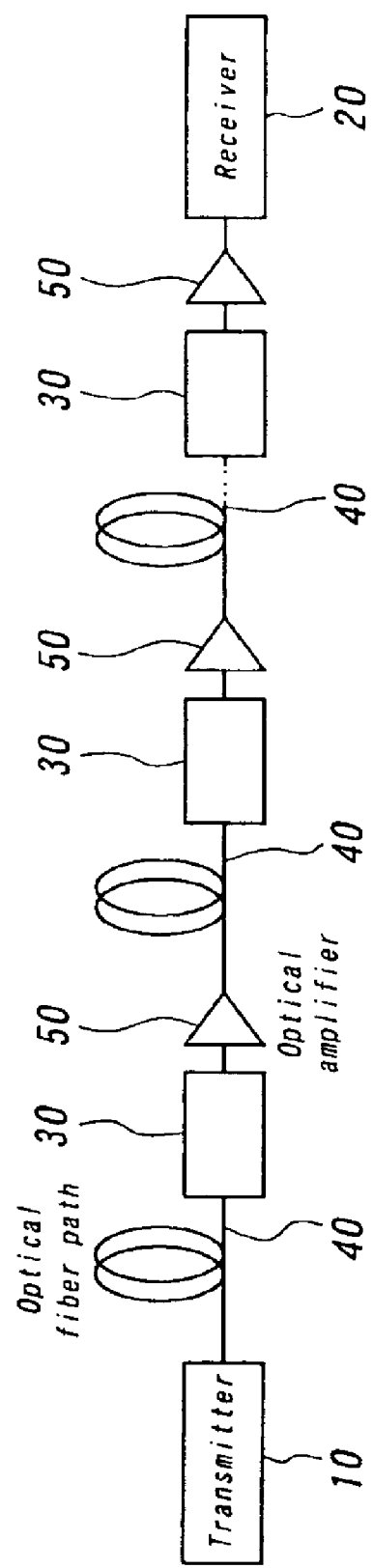
FIG. 1 is a structural view schematically illustrating an optical fiber communication system utilizing a method for compensating polarization mode dispersion according to the present invention.
Figure 2:
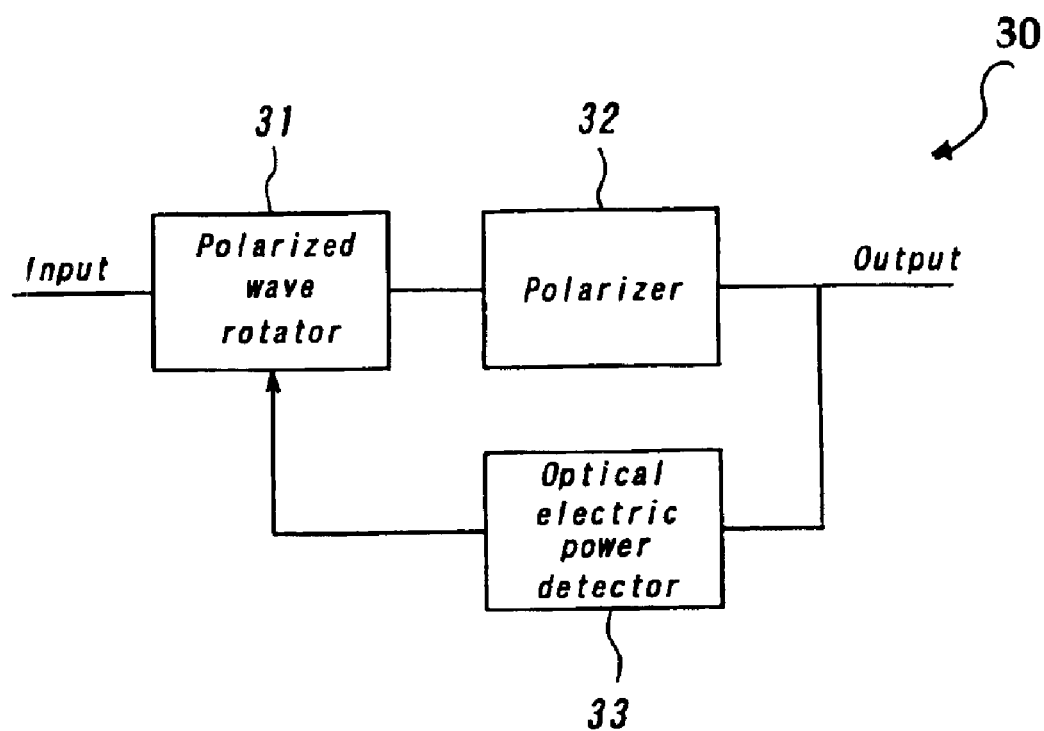
FIG. 2 is a schematic view illustrating the inside of the polarization mode compensator of the optical fiber communication system illustrated in FIG. 1.

FIG. 1 is a structural view schematically illustrating an optical fiber communication system utilizing a method for compensating polarization mode dispersion according to the present invention, and FIG. 2 is a schematic view illustrating the inside of the polarization mode compensator of the optical fiber communication system illustrated in FIG. 1.

In the optical fiber communication system illustrated in FIG. 1, a transmitter 10 is provided at the transmitting end, and a receiver 20 is provided at the receiving end. Then, a plurality of polarization mode dispersion compensators 30 are arranged between the transmitter 10 and the receiver 20. The transmitter 10 and the receiver 20 are connected with each other with optical fiber paths 40 via the polarization mode dispersion compensators 30. Then, optical amplifiers 50 are provided at the respective output ends of the polarization mode dispersion compensators 30.

As shown in FIG. 2, the polarization mode dispersion compensator 30 includes a polarized rotator 31 and a polarizer 32 which are arranged in the same line, and an optical electric power detector 33 which is provided on another line separated from the line where rotator 31 and the polarizer 32 are provided. An optical signal is introduced into the polarization rotator 31 of the polarization mode dispersion compensator 30 from the transmitter 10 on the optical communication path. The optical signal is also introduced into the polarizer 32 from the polarization rotator 31 to pass a linear polarization of the optical signal through the polarizer 32. The linear polarization is detected at the optical electric power detector 33.

When the optical signal is introduced into the polarization rotator 31, the plane of polarization of the optical signal is rotated so that the output of the optical signal (linear polarization) is maximized at the optical electric power detector 33. In this case, the wave distortion of the optical signal due to the polarization mode dispersion can be inhibited, and thus, the optical signal can not be almost degraded, so that the bit error rate in the optical communication can be reduced to realize the optical communication under good condition.

The polarization rotator 31 is preferably made of a Faraday rotator, but may be made of a polarization controller utilizing electro-optic effect or a mechanically movable polarization controller.

The optical signal is introduced into and amplified at the optical amplifiers 50 after the removing of the wave distortion due to the polarization mode dispersion at the polarization mode dispersion compensator 30. In this case, the signal loss caused by the polarizer in the compensator can be compensated uniformly at the respective optical amplifiers 50, and the total noise generated by the amplifiers can be reduced effectively, so that the higher signal/noise ratio (S/N ratio) of the optical signal can be maintained. The optical amplifiers 50 may be made of various amplifies commercially available, but preferably made of rare earth metal doped optical fiber amplifiers.

In the optical fiber communication system illustrated in FIG. 1, the polarization mode dispersion compensators 30 and the optical amplifiers 50 are alternately provided on the optical communication path. After the wave distortion of the optical signal to be transferred can be removed at the compensators 30 and the output of the optical signal can be amplified at the optical amplifiers 50, the optical signal is received at the receiver 20.

For example, the polarization mode dispersion compensators 30 and the optical amplifiers 50 are arranged alternately and respectively by a given space within several ten km to several hundred km. In this case, the optical communication can be performed over long communication path.

Although the present invention was described in detail with reference to the above examples, this invention is not limited to the above disclosure and every kind of variation and modification may be made without departing from the scope of the present invention. In the above-mentioned embodiment, for example, the polarization mode dispersion of the optical signal is reduced with the plural polarization mode dispersion compensators on the optical fiber communication path, but may be done with a single polarization mode dispersion compensator.

As mentioned above, according to the present invention, the wave distortion of the optical signal due to the polarization mode dispersion can be reduced sufficiently to reduce the bit error rate in the optical communication. Therefore, the optical communication can be realized over long communication path under good condition.

What is claimed is:

1. A method for compensating polarization mode dispersion, comprising the steps of:
    extracting and selecting an optical signal as a monitoring signal,
    detecting an output of said optical signal, and
    controlling said optical signal so that said output of said optical signal is maximized through rotation of a plane of polarization of said optical signal.

2. The compensating method as defined in claim 1, wherein said optical signal is controlled with a polarization mode dispersion compensator.

3. The compensating method as defined in claim 2, wherein said polarization mode dispersion compensator comprises a polarization rotator, a polarizer and an optical electric power detector, whereby said optical signal is introduced into said polarization rotator to control said optical signal so that said output of said optical signal is maximized through the rotation of a plane of polarization of said optical signal, and then, introduced into said polarizer to pass a linear polarization of said optical signal therethrough, and then, introduced into said optical electric power detector to detect said output of said optical signal.

4. The compensating method as defined in claim 1, wherein said optical signal is controlled in multistage with a plurality of polarization mode dispersion compensators.

5. The compensating method as defined in claim 3, wherein said polarization rotator is a Faraday rotator.

6. The compensating method as defined in claim 1, further comprising the step of amplifying said output of said optical signal.

7. The compensating method as defined in claim 6, wherein said output of said optical signal is amplified with a rare earth metal doped optical fiber amplifier.

8. A polarization mode dispersion compensator, comprising:
    a polarization rotator,
    a polarizer, and
    an optical electric power detector,
    wherein a given optical signal is introduced as a monitoring signal into said polarization rotator to rotate a plane of polarization of said optical signal so that an output of said optical signal is maximized, and then, introduced into said polarizer to pass a linear polarization of said optical signal therethrough, and then, introduced into said optical electric power detector to detect said output of said optical signal.

9. The polarization mode dispersion compensator as defined in claim 8, wherein said polarization rotator is a Faraday rotator.

10. An optical fiber communication system, comprising:
a transmitter,
a receiver,
a polarization mode dispersion compensator which includes a polarization rotator, a polarizer and an optical electric power detector and which is provided between said transmitter and said receiver, and
an optical fiber path to connect said transmitter and said receiver via a polarization mode dispersion compensator and to transfer a given optical signal to said receiver from said transmitter,
whereby said optical signal is introduced into said polarization rotator to control said optical signal so that said output of said optical signal is maximized through rotation of a plane of polarization of said optical signal, and then, introduced into said polarizer to pass a linear polarized wave of said optical signal therethrough, and then, introduced into said optical electric power detector to detect said output of said optical signal.

11. The optical fiber communication system as defined in claim 10, wherein said polarization rotator is a Faraday rotator.

12. The optical fiber communication system as defined in claim 10, further comprising an amplifier provided between said transmitter and said receiver.

13. The optical fiber communication system as defined in claim 12, wherein said amplifier is a rare earth metal doped optical fiber amplifier.

14. An optical fiber communication system, comprising:
a transmitter,
a receiver,
a plurality of polarization mode dispersion compensators each of which includes a polarization rotator, a polarizer and an optical electric power detector and is provided between said transmitter and said receiver, and
an optical fiber path to connect said transmitter and said receiver via a polarization mode dispersion compensator and to transfer a given optical signal to said receiver from said transmitter,
whereby said optical signal is introduced into said polarization rotator to control said optical signal so that said output of said optical signal is maximized through rotation of a plane of polarization of said optical signal, and then, introduced into said polarizer to pass a linear polarized wave of said optical signal therethrough, and then, introduced into said optical electric power detector to detect said output of said optical signal.

15. The optical fiber communication system as defined in claim 14, wherein said polarization rotator is a Faraday rotator.

16. The optical fiber communication system as defined in claim 14, further comprising an amplifier provided between said transmitter and said receiver.

17. The optical fiber communication system as defined in claim 16, wherein said amplifier is a rare earth metal doped optical fiber amplifier.

* * * * *